(12) United States Patent
Schoch

(10) Patent No.: US 10,525,808 B2
(45) Date of Patent: Jan. 7, 2020

(54) PROFILE STRIP ARRANGEMENT

(71) Applicant: ELKAMET KUNSTSTOFFTECHNIK GMBH, Biedenkopf (DE)

(72) Inventor: Andreas Schoch, Gladenbach (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 0 days.

(21) Appl. No.: 16/070,294

(22) PCT Filed: Mar. 7, 2017

(86) PCT No.: PCT/EP2017/055352
§ 371 (c)(1),
(2) Date: Jul. 16, 2018

(87) PCT Pub. No.: WO2017/157726
PCT Pub. Date: Sep. 21, 2017

(65) Prior Publication Data
US 2019/0016201 A1    Jan. 17, 2019

(30) Foreign Application Priority Data

Mar. 16, 2016 (EP) ..................... 16160642

(51) Int. Cl.
*B60J 10/32* (2016.01)
*B60J 10/35* (2016.01)
*B60J 10/70* (2016.01)

(52) U.S. Cl.
CPC ............... *B60J 10/32* (2016.02); *B60J 10/35* (2016.02); *B60J 10/70* (2016.02)

(58) Field of Classification Search
CPC ............. B60J 10/32; B60J 10/35; B60J 10/70
See application file for complete search history.

(56) References Cited

U.S. PATENT DOCUMENTS

| 4,505,965 A | 3/1985 | Zipperle |
| 2011/0018303 A1 | 1/2011 | Timmermann et al. |

(Continued)

FOREIGN PATENT DOCUMENTS

| DE | 102008003252 A1 | 7/2009 |
| DE | 202008013133 U1 | 2/2010 |

(Continued)

*Primary Examiner* — Lori L Lyjak
(74) *Attorney, Agent, or Firm* — Leydig, Voit & Mayer, Ltd.

(57) ABSTRACT

A profile strip arrangement includes a profile strip made of a profile material. The profile strip has a first connecting area for creating a connection to an edge area of a windshield of a motor vehicle, and a second connecting area which is connectable to a water tray cover that is to be arranged adjacent to the windshield. The first connecting area has a surface section that is free of the profile material. The surface section faces the edge area of the windshield, and at least a partial area of the surface section is covered by a double-sided adhesive tape which provides an adhesive connection to the edge area of the windshield. The surface section is formed by a surface of an additional element that is made of metal or by a surface of a coating of the additional element.

8 Claims, 5 Drawing Sheets

(56) References Cited

U.S. PATENT DOCUMENTS

2011/0115261 A1    5/2011  Platt et al.
2011/0181071 A1    7/2011  Schaff et al.

FOREIGN PATENT DOCUMENTS

| DE | 102009010015 A1 | 8/2010 | |
| DE | 102012112663 A1 | 6/2014 | |
| DE | 102012112674 A1 | 6/2014 | |
| DE | 202014106204 U1 | 3/2015 | |
| EP | 0076924 A2 | 4/1983 | |
| EP | 0282918 A2 * | 9/1988 | ............. B60J 10/16 |
| EP | 2123497 A1 | 11/2009 | |
| GB | 2093106 A | 8/1982 | |

* cited by examiner

PROFILE STRIP ARRANGEMENT

CROSS-REFERENCE TO PRIOR APPLICATIONS

This application is a U.S. National Stage Application under 35 U.S.C. § 371 of International Application No. PCT/EP2017/055352 filed on Mar. 7, 2017, and claims benefit to European Patent Application No. EP 16160642.1 filed on Mar. 16, 2016. The International Application was published in German on Sep. 21, 2017, as WO 2017/157726 A1 under PCT Article 21(2).

FIELD

The invention relates to a profile strip arrangement, comprising a profile strip made of a profile material, having a first connecting area for purposes of creating a connection to an edge area of the windshield of a motor vehicle, and having a second connecting area for purposes of creating a connection to a part that is adjacent to the windshield.

BACKGROUND

Profile strip arrangements of the above-mentioned type are disclosed, for example, in German utility model DE 20 2008 013 133 U1. This publication proposes the use of a connecting strip to attach the profile strip to the rear surface of the windshield, thereby creating a simple, fast and cost-effective connection. An example of a connecting strip is a double-sided adhesive tape of the kind disclosed in German patent application DE 10 2012 112 663 A1.

Another refinement is known from German patent application DE 10 2008 003 252 A1. This document proposes using not only a double-sided adhesive tape, but also an adhesive section that has been applied while in the free-flowing state in order to create the stiffest possible connection between a profile strip and a windshield.

Another refinement is disclosed in German patent application DE 10 2012 112 674 A1. This publication proposes that a double-sided adhesive tape be integrally bonded to an additional adhesive bead in the area of a front edge in order to prevent the adhesive tape from peeling off.

SUMMARY

In an embodiment, the present invention provides a profile strip arrangement which includes a profile strip made of a profile material. The profile strip has a first connecting area for creating a connection to an edge area of a windshield of a motor vehicle, and a second connecting area which is connectable to a part in the form of a water tray cover that is to be arranged adjacent to the windshield. The first connecting area has at least one surface section that is free of the profile material. The at least one surface section faces the edge area of the windshield, and at least a partial area of the at least one surface section is covered by an adhesive section in the form of a double-sided adhesive tape which provides an adhesive connection to the edge area of the windshield. The at least one surface section is formed by a surface of an additional element that is made of metal or by a surface of a coating of the additional element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
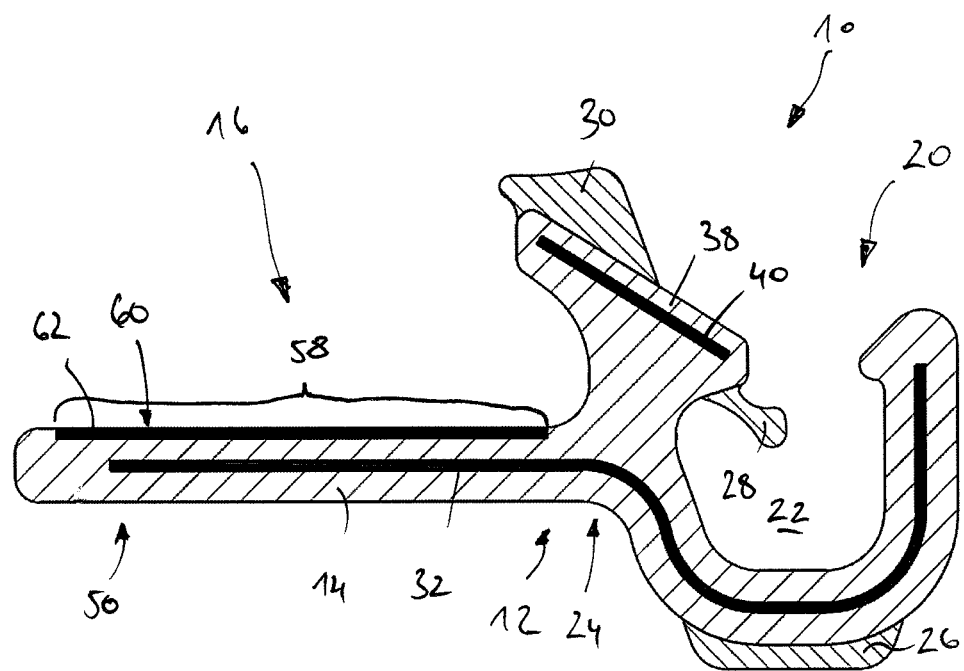
FIG. 1 a side view of a first embodiment of a profile strip arrangement, comprising a profile strip with an additional element.

The above-mentioned constructions have proven to be too expensive in actual practice. Before this backdrop, embodiments of the present invention improve a profile strip arrangement of the above-mentioned type in such a way that it can be produced cost-effectively.

This is achieved according to embodiments of the invention in that the first connecting area has at least one surface section that is free of the profile material, whereby the free surface section is formed by the surface of an additional element that is made of metal or by the surface of a coating of the additional element.

According to embodiments of the invention, in the first connecting area, a surface section is provided that is free of profile material. In a generally known manner, the profile material is a plastic material, for instance, polyvinyl chloride (PVC), blends of polyvinyl chloride and poly(acrylonitrile-co-butadiene-co-styrene) (PVC/ABS) or polypropylene (PP). Particularly polypropylene has proven to be sturdy and resistant in profile strip arrangements. The profile material, however, does not have any optimal properties when it comes to creating an integral bond to the windshield or to connecting layers situated in between.

According to an embodiment of the invention, in the area of the surface section that is free of the profile material, a surface is provided that is made of a different material. The carrier of this surface that is made of a different material is an additional element made of metal.

The additional element is especially a flat body that is arranged at least in partial sections of the first connecting area.

According to an embodiment of the invention, the additional element is made of metal, especially of steel or of a steel alloy or of aluminum or of an aluminum alloy. Such a metal additional element exhibits better adhesive properties than the profile material.

It is possible for the surface of the additional element to be the surface that is arranged in the area of the surface section that is free of the profile material. However, it is likewise possible for the additional element to be coated; in this case, the surface section that is free of the profile material is formed by a surface that is made of the coating material and that is supported by the additional element. The coating can be, for instance, a protective layer or coupling layer.

In order to achieve a simple and strong connection between the first connecting area of the profile strip and the edge area of the windshield, it is preferable for the first connecting area to have a lower connecting section which interacts with the inside of the edge area of the windshield, and/or for the first connecting area to have a lateral connecting section that interacts with a face of the edge area of the windshield, and/or for the first connecting area to have an upper connecting section that interacts with the outside of the edge area of the windshield, and for the at least one free surface section to be arranged on the lower connecting section and/or on the lateral connecting section and/or on the upper connecting section. In a preferred embodiment, at least one lower connecting section is provided that interacts with the inside of the edge area of the windshield. This lower connecting section makes it possible to create a sturdy connection with a relatively large surface area between the profile strip and the inside of the edge area of the windshield.

In addition or as an alternative to this, however, it is also possible for a free surface section to be provided on a lateral connecting section of the first connecting area.

An upper connecting section of a first connecting area is provided especially in the case of profile strips that have a so-called U-shaped connection of the profile strip to the edge area of the windshield. In this U-shaped connection, there is a lower connecting section as well as a lateral connecting section and also an upper connecting section, whereby the lower connecting section and the upper connecting section form the legs of a "U" and wrap around the edge area of the windshield.

A particularly simple and compact connection option between the profile strip and the windshield is created when the free surface section faces the edge area of the windshield.

The profile strip arrangement according to the invention is especially suitable for profile strips that have a receiving space with a U-shaped or V-shaped profile in the second connecting area for purposes of receiving a latching element of the part that is adjacent to the windshield, particularly an air inlet panel (also referred to as a water tray cover). Such second connecting areas are disclosed, for example, in European patent application EP 2 123 497 A1.

It is possible for the additional element to be arranged only in the first connecting area, where it extends exclusively in the free surface section. In this manner, an additional element, which is relatively small and easy to produce, is sufficient in order to create better preconditions for an integral bond between the profile material and the windshield.

However, it can also be preferable for the bottom as well as the top of the additional element to be covered with profile material in the area of a partial section of the additional element. Such an additional element therefore has at least one partial area in which the additional element is anchored in the profile material of the profile strip.

The above-mentioned partial section can especially be a free end of the additional element and/or a section of the additional element facing the second connecting area. As a result, the additional element is optimally protected against detachment from the profile material.

In another preferred embodiment of the invention, it is provided that the profile strip has a central section which connects the first connecting area and the second connecting area to each other, and that the additional element has openings in the area of the central section, especially in the form of perforations. This allows a further optimized anchoring of the additional element in the profile material of the profile strip.

In a particularly preferred embodiment, it is provided for the additional element to be formed by a reinforcement insert that stiffens the profile strip. Such a reinforcement insert can especially comprise foils or sheets made of metal, particularly steel or a steel alloy, or else aluminum or an aluminum alloy. The use of the reinforcement insert as an additional element by exposing the surface of a reinforcement insert in the first connecting area accounts for a particularly simple and cost-effective production of a profile strip arrangement.

In order to create an integral bond between the first connecting area and the windshield, it is proposed that at least a partial area of the free surface section is covered by an adhesive section that serves for purposes of creating an adhesive connection to the edge area of the windshield. It is possible for the adhesive section to be a free-flowing adhesive material that is applied onto the surface of the additional element in order to then be connected to the edge area of the windshield.

It is especially preferable for the adhesive section to be in the form of a double-sided adhesive tape. Owing to the inventive exposure of a surface section in which there is no profile material, adhesive tapes can be employed in this area whose adhesive properties only need to be optimized in terms of the surface of the additional element and in terms of the edge area of the windshield, but not in terms of the adhesiveness vis-à-vis the profile material of the profile strip. This allows the use of simple and inexpensive adhesive tapes.

The invention provides, according to an embodiment, a method with which a profile strip arrangement of the type described above can be produced cost-effectively.

According to an embodiment, this is achieved in that the profile strip and the additional element are produced independently of each other and subsequently joined together, especially glued and/or pressed together.

According to an embodiment, this is also achieved in that the material of the profile strip is extruded, in that the additional element is introduced during the extrusion of the profile material, and in that the profile material solidifies when it is connected to the additional element, at least in certain sections.

Embodiments and advantages of the method according to the invention have already been partially elaborated upon above. For this reason, reference is hereby made to the description above, along with the following additions:

The production of the profile strip and of the additional element independently of each other followed by the joining of these parts is particularly well-suited for profile strip arrangements in which the additional element extends exclusively in the free surface section.

If the additional element is introduced during the extrusion of the profile material, then the additional element is especially a continuous profiled extrudate made of a metallic material, whereby the continuous extrudate passes through the extrusion die together with the profile material, so that the additional element as well as the profile strip can be produced together with each other in a continuous process.

The profile strip arrangements shown in FIGS. 1 to 6 as well as 8 and 9 are designated in their entirety by the reference numeral 10. The profile strip arrangements 10 each comprise a profile strip 12 that is made of a profile material 14. The profile material 14 is a plastic, for example, a polyvinyl chloride (PVC), blends of polyvinyl chloride and poly(acrylonitrile-co-butadiene-co-styrene) (PVC/ABS) or especially polypropylene (PP).

The profile strips 12 each have a first connecting area 16 for purposes of creating a connection to a windshield 18 (see FIGS. 3 and 4), as well as a second connecting area 20 to connect the profile strip 12 to a part that is adjacent to the windshield 18, especially an air inlet panel. Such parts are disclosed, for example, in European patent application 2 123 497 A1 and they have latching elements that latch into a U-shaped or V-shaped receiving space 22 of the second connecting area 20 so that the part that is adjacent to the windshield can be attached to the profile strip 12.

The profile strips 12 each have a central section 24 in order to connect the first connecting area 16 and the second connecting area 20.

It is possible for the profile strips 12 to have additional functional sections that are made of a material that differs from the profile material 14. Such functional sections can be, for instance, a support section 26 that supports the second connecting area 20 on a vehicle part. It can also be, for example, a latching element 28 that is associated with the second connecting area 20. It can also be a sealing element 30 that serves to create a tightly sealed contact against a windshield and against the part that is adjacent to the windshield.

It is possible and preferred for the profile strips 12 to be reinforced with a reinforcement insert 32 along their extension between the first connecting area 16 and the second connecting area 20. The reinforcement insert 32 is especially a profiled flat body made of steel, of a steel alloy, of aluminum or of an aluminum alloy.

Figure 9:
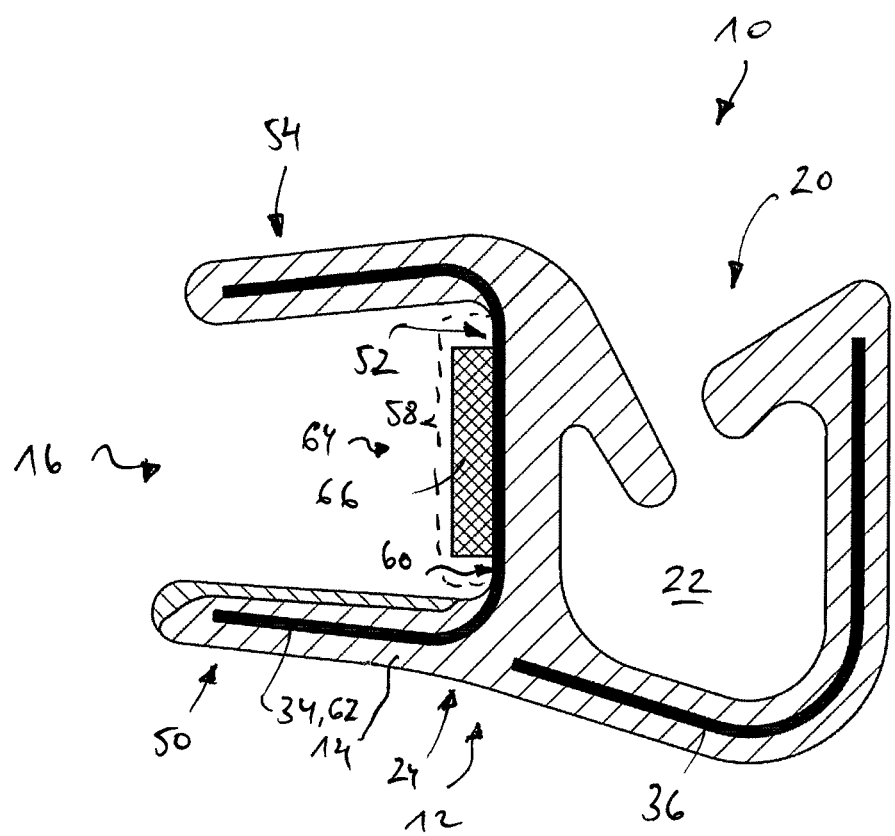
FIG. 9 a side view of another embodiment of a profile strip arrangement, with a profile strip that has a first connecting section with a U-shaped configuration.

It is also possible for a reinforcement insert to be associated only and exclusively with one connecting area 16 or 20, see FIG. 9, reinforcement inserts 34 and 36 there.

Moreover, in the case of an arrangement of a sealing element 30, it is preferable for a carrier section 38 of the profile strip 12 that carries the sealing element 30 to be likewise reinforced with a reinforcement insert 40.

When the windshield 18 is installed in a motor vehicle, it has a lower edge area 42 that interacts with the first connecting area 16 of the profile strip 12. The edge area 42 has an outside 44, a face 46 and an inside 48; see FIGS. 3 and 4.

The first connecting area 16 of the profile strip 12 has at least a lower connecting section 50 that interacts with the inside 48 of the edge area 42 of the windshield 18. It is possible to additionally provide a lateral connecting section 52 (see FIGS. 4 and 9) that interacts with the face 46 of the edge area 42 of the windshield 18.

It is also possible to provide an upper connecting section 54 that interacts with the outside 44 of the edge area 42 of the windshield 18, see FIG. 9.

In the first connecting area 16, the profile strips 12 have a surface section 58 that is free of profile material 14. The surface section 58 is formed by a surface 60 of an additional element 62 or else by the surface of a coating of the additional element 62 instead of the profile material 14.

In the state in which the edge area 42 of the windshield 18 is arranged in or on the first connecting area 16, the surface 60 faces the edge area 42. When the surface 60 is provided on the lower connecting section 50, the surface 60 faces the inside 48 of the edge area 42 of the windshield (see FIGS. 1 to 6 and 8). If the surface 60 is arranged on a lateral connecting section 52, the surface 60 faces the face 46 of the edge area 42 of the windshield 18 (see FIGS. 4 and 9). If the surface 60 is arranged on the upper connecting section 54 (see FIG. 9), the surface 60 faces the outside 44 of the edge area 42 of the windshield 18.

Figure 2:
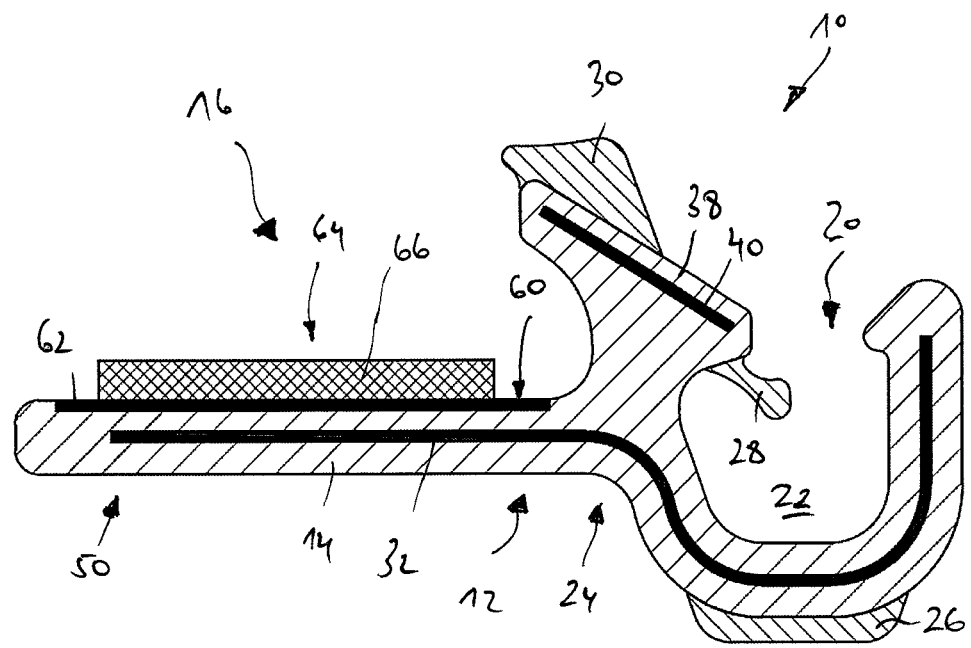
FIG. 2 the profile strip arrangement according to FIG. 1, additionally comprising an adhesive section.
Figure 3:
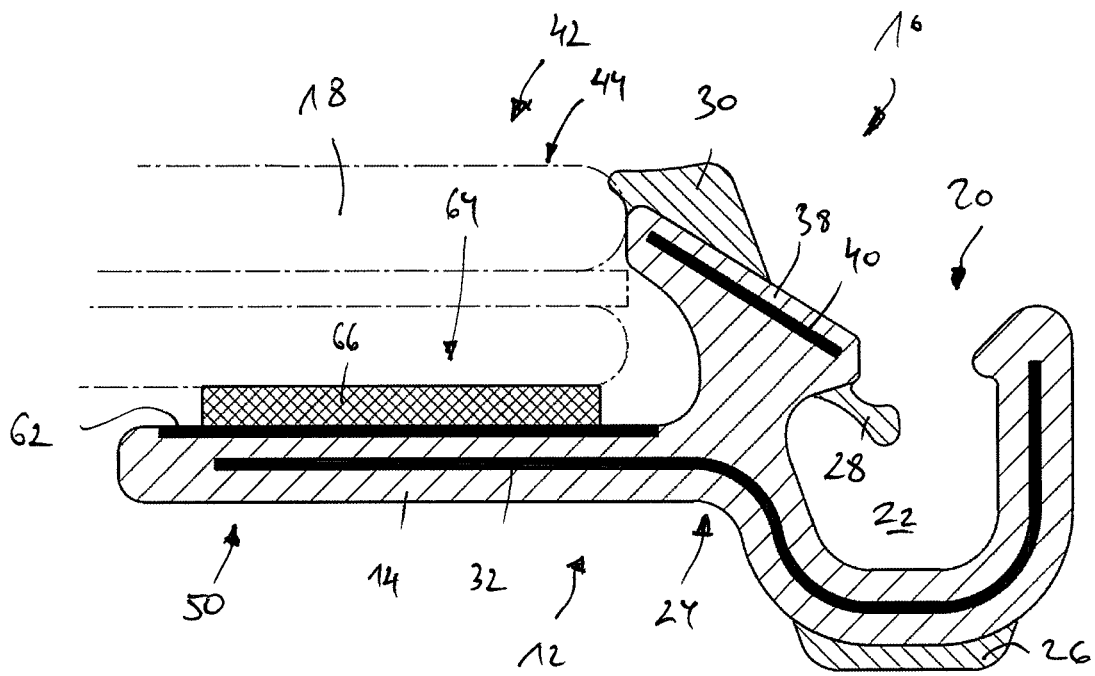
FIG. 3 the profile strip arrangement according to FIG. 2, additionally comprising a windshield.

The additional element 62 according to FIGS. 1 to 3 is an additional element that is provided separately from the reinforcement inserts 32, 40 of the profile strip arrangements 10 and arranged at a distance from the reinforcement inserts 32, 40. This additional element 62 extends exclusively in the free surface section 58.

The additional element 62 is especially a plane flat element. The flat element is made of a metallic material, especially of steel or of a steel alloy or of aluminum or of an aluminum alloy. It can be the case that the additional material 62 itself or else a coating of the additional element 62 forms the surface 60.

For purposes of creating an integral bond between the additional element 62 and the edge area 42 of the windshield 18, an adhesive section 64 is provided that is especially in the form of a double-sided adhesive tape 66. The adhesive tape 66 has adhesive sides facing away from each other. A first adhesive side interacts with the surface 60 of the additional element 62 while a second adhesive side facing away from the first side interacts with the inside 48 of the edge area 42 of the windshield 18.

It is possible for the profile strips 12 not to have any reinforcement inserts 32, 40. If at least one reinforcement insert 32, 40 is provided, it is preferable for such a reinforcement insert 32 and/or 40 to form an additional element 62, and it is preferable for the profile strip 12 not to have an additional element 62 that is provided separately. Such arrangements are depicted in FIGS. 4 to 6, 8 and 9.

Figure 4:
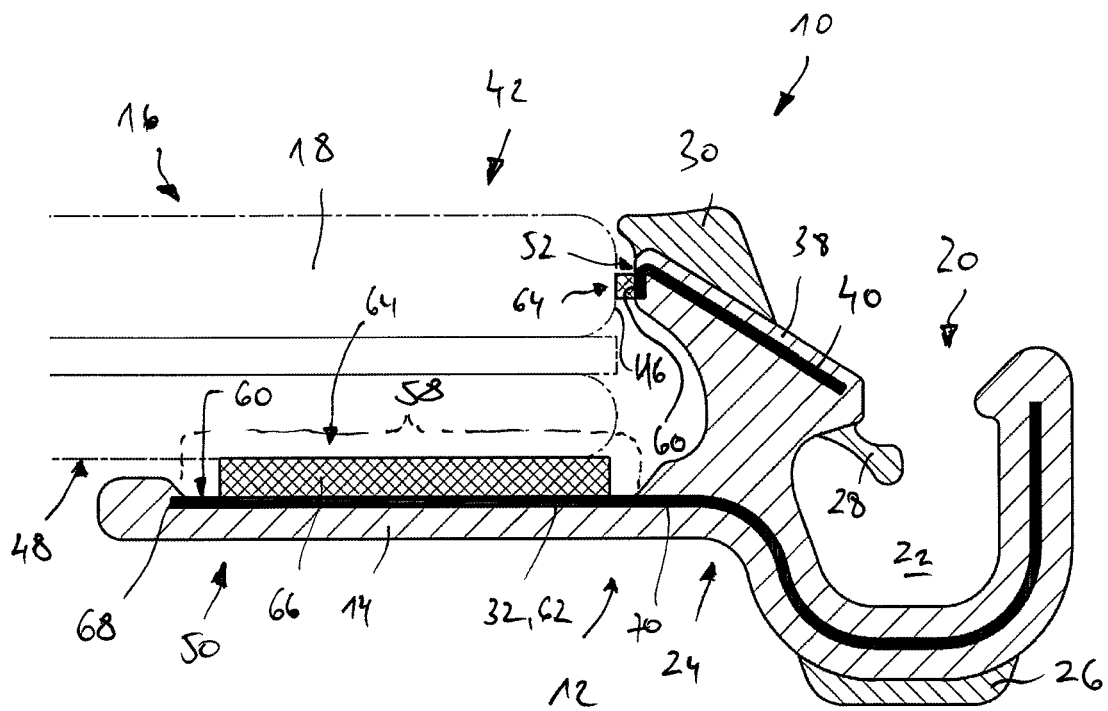
FIG. 4 a side view of another embodiment of a profile strip arrangement, comprising at least an additional element in the form of a reinforcement insert.

For instance, a reinforcement insert 32 is provided which is embedded into the material 14 of the profile strip 12 (see FIG. 4). In a surface section 58, the surface 60 of the reinforcement insert 32 or of a coating of the reinforcement insert 32 is exposed, so that the surface of the reinforcement insert 32 or a coating of the reinforcement insert 32 can be provided with an adhesive section 64, especially with a double-sided adhesive tape 66.

Preferably, the top and the bottom of a free end 68 of the reinforcement insert 32 are covered by profile material 14 and therefore at least a partial area of the reinforcement insert 32 is anchored in the profile material 14 of the profile strip 12. This applies in a corresponding manner to a section 70 of the reinforcement insert 32 facing the second connecting area 20.

In the embodiment depicted in FIG. 4, the thickness of the profile material 14 varies along the extension of the lower connecting section 50, as seen in the cross sectional direction.

Figure 5:
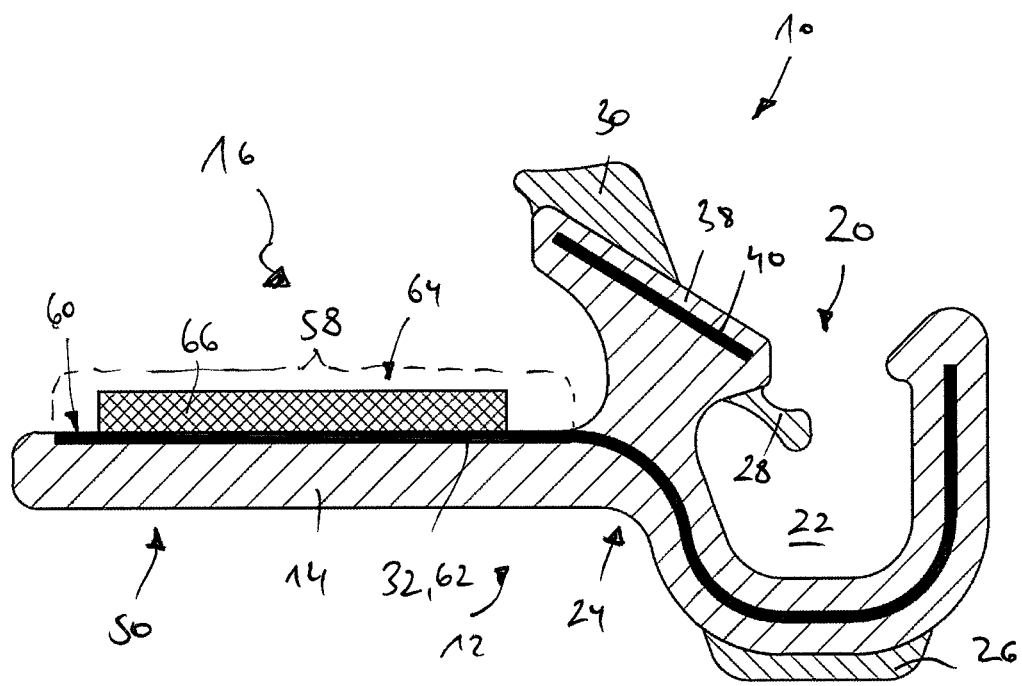
FIG. 5 a side view of another embodiment of a profile strip arrangement.
Figure 6:
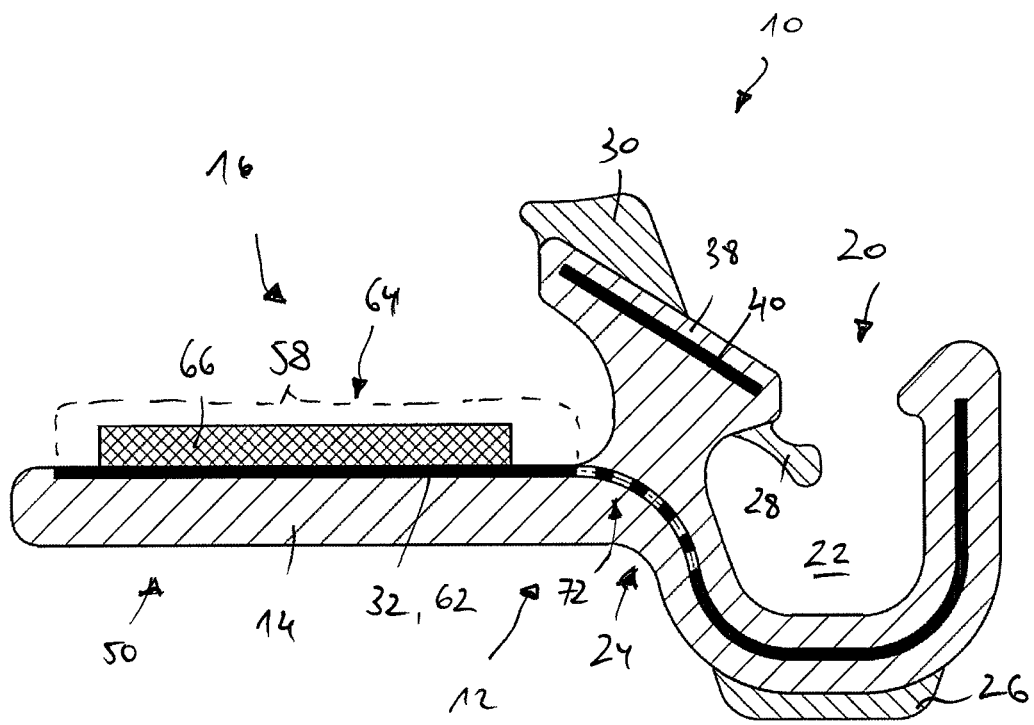
FIG. 6 a side view of another embodiment of a profile strip arrangement.
Figure 8:
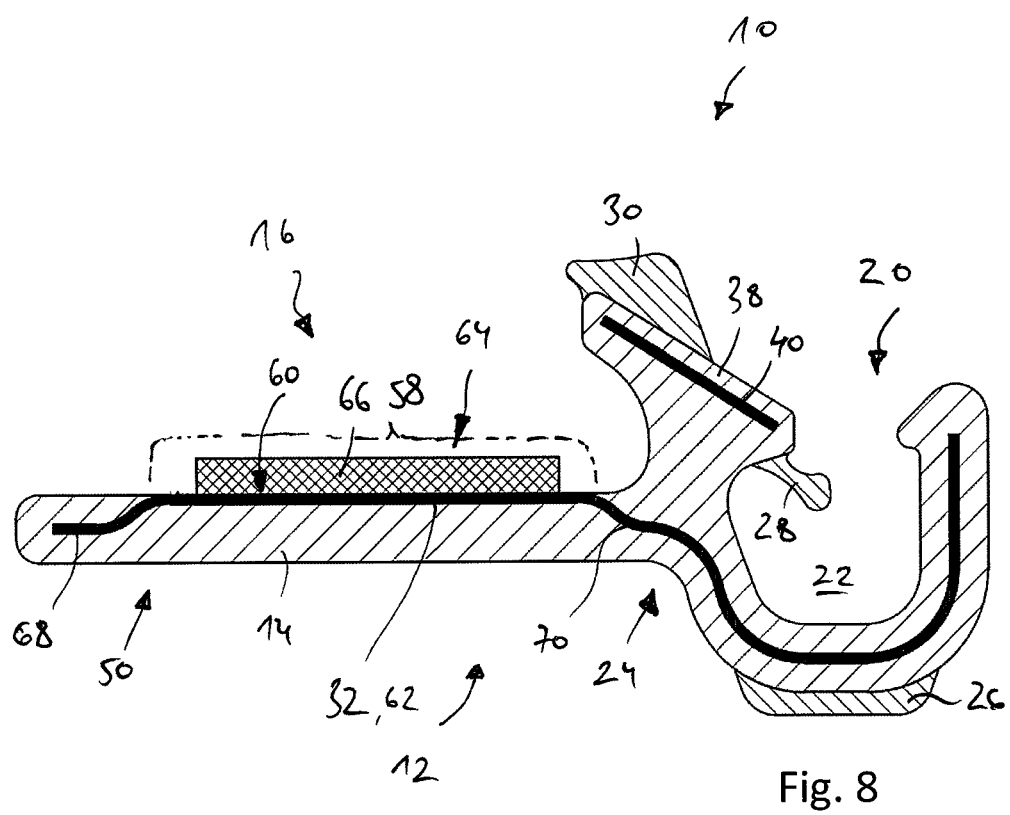
FIG. 8 a side view of another embodiment of a profile strip arrangement.

It is likewise possible for the material thickness of the connecting section 50 not to vary, whereby, at the same time, a reinforcement insert 32 is employed as an additional element, see FIGS. 5, 6 and 8.

Figure 7:
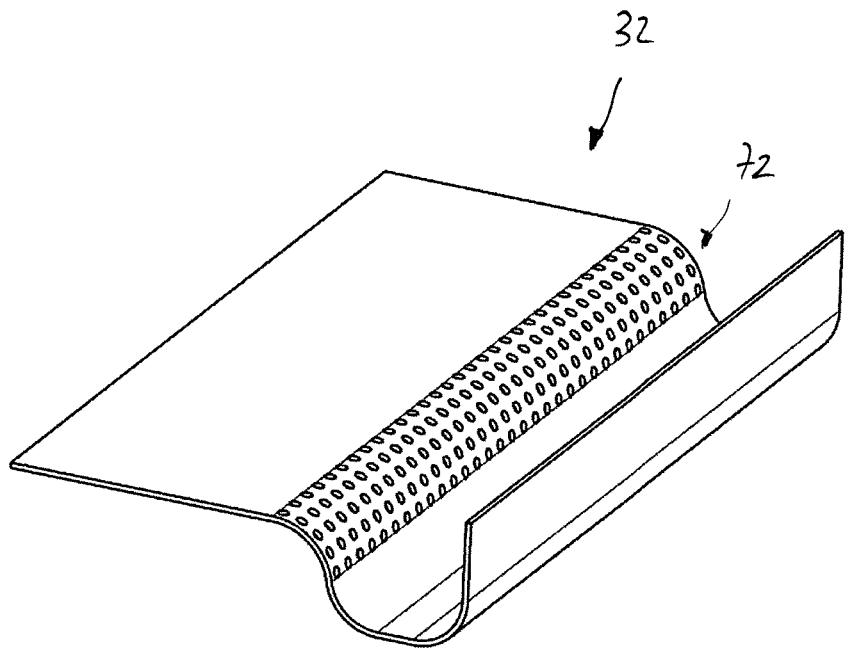
FIG. 7 a perspective view of a reinforcement insert of the profile strip arrangement according to FIG. 6.

In the embodiment shown in FIG. 5, the reinforcement insert 32 that forms an additional element 62 extends along a straight plane and in this area, it is only covered with profile material 14 on one side. In order to improve the anchoring of the reinforcement insert 32 in the profile material 14, it can be provided that the reinforcement insert 32 has perforations 72, as a result of which the possibility is created for the profile material 14 to penetrate into the reinforcement insert 32, see FIGS. 6 and 7. Preferably, the perforations 72 are associated with the central section 24 of the profile strip 12.

Another preferred way for a reinforcement insert 32 that forms an additional element to be anchored in the material 14 of the profile strip 12 is for the bottom as well as the top of at least a free end 68 and/or a section 70 of the reinforcement insert 32 that faces the second connecting area 20 to be covered with profile material 14, see FIG. 8. In this case, an additional element 62 can be created in that the reinforcement insert 32 is not embedded into the profile material 14 along its entire extension from the free end 68 all the way to the section 70, but rather, in that it is covered with profile material 14 only on the bottom in the area of a free surface section 58. This can be done, for example, in that the reinforcement insert 32 has an elevation along its extension between the free end 68 and the section 70, so that the top of the reinforcement insert 32, which is opposite from the bottom, forms a surface 60 that is free of profile material 14. In this manner, the reinforcement insert 32 forms an additional element 62 in this area which preferably serves for the placement of a double-sided adhesive tape 66 or on which a double-sided adhesive tape 66 is glued.

It is also possible for a reinforcement insert 34 to form a surface 60 that is free of the profile material 14 along the entire extension of a connecting section 50, 52 and/or 54, see FIG. 9. There, by way of example, the lateral connecting section 52 is completely free of profile material 14 and serves for the placement of an adhesive section 64. In such a case, it is preferable for the reinforcement insert 34 to be embedded in at least one adjacent section of the profile strip 12, for example, in the lower connecting section 50 and/or in the upper connecting section 54.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A profile strip arrangement, comprising:
 a profile strip made of a profile material, the profile strip having a first connecting area for creating a connection to an edge area of a windshield of a motor vehicle, and having a second connecting area that is connectable to a part in the form of a water tray cover that is to be arranged adjacent to the windshield,
 wherein the first connecting area has at least one surface section that is free of the profile material, the at least one surface section facing the edge area of the windshield, and at least a partial area of the at least one surface section being covered by an adhesive section in the form of a double-sided adhesive tape which provides an adhesive connection to the edge area of the windshield, and
 wherein the at least one surface section of the first connecting area of the profile strip is formed by a surface of an additional element that is made of metal or by a surface of a coating of the additional element.

2. The profile strip arrangement according to claim 1, wherein the first connecting area has a lower connecting section which interacts with an inside of the edge area of the windshield, and/or wherein the first connecting area has a lateral connecting section that interacts with a face of the edge area of the windshield, and/or wherein the first connecting area has an upper connecting section that interacts with an outside of the edge area of the windshield, and wherein the at least one surface section is arranged on the lower connecting section and/or on the lateral connecting section and/or on the upper connecting section.

3. The profile strip arrangement according to claim 1, wherein the second connecting area has a receiving space with a U-shaped or V-shaped profile for purposes of receiving a latching element of the water tray cover.

4. The profile strip arrangement according to claim 1, wherein the additional element extends exclusively in the at least one surface section.

5. The profile strip arrangement according to claim 1, wherein, in a partial section of the additional element, the bottom and the top of the additional element are covered with the profile material.

6. The profile strip arrangement according to claim 5, wherein the partial section is formed by a free end of the additional element and/or by a section of the additional element facing the second connecting area.

7. The profile strip arrangement according to claim 1, wherein the profile strip has a central section which connects the first connecting area and the second connecting area to each other, and wherein the additional element has openings in the form of perforations in the area of the central section.

8. A profile strip arrangement according to claim 1, wherein the additional element is formed by a reinforcement insert that stiffens the profile strip.

\* \* \* \* \*